UNITED STATES PATENT OFFICE.

CHARLES FRANCIS LAWTON, ALBERT L. LAWTON, AND ARTHUR W. LAWTON, OF WASHINGTON, DISTRICT OF COLUMBIA.

METHOD OF TREATING TILES.

SPECIFICATION forming part of Letters Patent No. 623,919, dated April 25, 1899.

Application filed June 8, 1894. Serial No. 513,946. (No specimens.)

*To all whom it may concern:*

Be it known that we, CHARLES FRANCIS LAWTON, ALBERT L. LAWTON, and ARTHUR W. LAWTON, citizens of the United States, residing at Washington, in the District of Columbia, have invented certain new and useful Improvements in Methods of Treating Tiles, of which the following is a specification.

This invention relates to methods of treating tiles.

The object is in a ready, efficient, and comparatively inexpensive manner to produce tiles colored, opaque, translucent, or transparent, such as those used for ornamental and decorative purposes, which when set in place will adhere to a wall, ceiling, or the like with the utmost tenacity, resisting all efforts short of violence to dislodge them from position.

The invention consists in the various novel details, as will hereinafter be more fully described and claimed.

The present invention is strongly to be distinguished in the art from performances in which the substance to form the cementing agent or cement composition between the tile and any added granulous material is in the nature of or in effect a flux—that is to say, a substance which has to be fused in order to make it effective—inasmuch as the cementing agent of the present invention has never to be melted, but by simply drying it becomes hard and retentive, and when this drying is continued becomes insoluble, and by drying and subsequently heating even far below the point of fusion it at once becomes insoluble. A marked advantage of the obviation of the necessity of fusion is that where a substance has to be fused in order to give it in this art the proper functions of a cementing agent or binder between the tile and the added granulous material the melting of the cementing agent causes the same to creep up in the form of smooth-surfaced cones around the particles of granulous material, thus masking such particles and covering their irregularities and angles and so depriving them, particle by particle, of their retentive functions, in consequence of which the granulous material thus treated can then scarcely be said, properly speaking, to be fully of the nature of retaining-points.

The basis of the cementing agent in the present case is an aqueous solution of an alkaline silicate or so-called "water-glass;" but water-glass alone will not become properly insoluble upon drying and exposure for some time nor upon drying and heating to a point below fusion. To render the water-glass thus capable of becoming hard and insoluble on drying and upon exposure or upon drying and heating, as described, we have discovered that it is necessary to add to it a certain class of metallic oxids—that is to say, oxids of the metals, exclusive of the oxids or hydrates of sodium or potassium, which would not give the proper insolubility to the cement. The proper metallic oxids are best added in body with insoluble vitreous matter, such as insoluble glass—that is to say, after having previously been incorporated with insoluble glass—and to this end any suitable substance for an insoluble glass, such as silicate of soda and lime, is fused with such metallic oxids, taken in quantity strongly to color the glass and render it opaque or to render it opaque without color—that is to say, opaque white—and the colored glass thus produced is then ground to a fine powder and mixed with the alkaline-silicate solution. This presents a cementing agent which upon subsequent drying and, if desired, heating will form a hard and insoluble substance. The purpose of making the cementing agent opaque with or without color is that any surface to which it is applied may not show through it.

As a specific illustration of a cementing agent which may be formed in accordance with our invention the following will serve: Take about fifty parts of an alkaline-silicate solution of the consistency of syrup and to this add about fifty parts of finely-ground metallic-oxid-impregnated glass, as described above, and grind the whole together or mix it thoroughly by any suitable means.

It will be observed that any desired color may be imparted to the cementing agent by the selection of a particular metallic oxid or particular metallic oxids and that the color as to tints and shades may be modified or that the effect may be made that of variegated color by the employment of different oxids.

If lighter shades or more opaque glass be desired, the amount of the ground colored glass may be diminished and its place supplied with marble flour or with finely-ground silica of the kind known as "floated flint flour." Where a pure white is wanted, a colorless insoluble glass is fused with tin oxid or with tribasic calcium phosphate or with cryolite, any one of which communicates a white opaque effect to glass when fused into its composition. This white glass so produced is after fusion and cooling ground to fine powder, the same as with the colored glass before named, and the powder is mixed with alkaline silicate, together with the carbonate of lime and powdered silica, and the whole is then finely ground together.

The colors imparted to the cementing agent by the colored glass powders, as described, may be intensified or otherwise modified to produce different shades and tints by employing some of the powdered carbonate of lime or silica in the compound with vermilion (sulfid of mercury) or India red (silicate of iron) or finely-ground peroxid of iron or ultramarine green or blue. When ultramarine is used, it should first be ground in sufficient water only to moisten it, and generally the color as to tints and shades may be modified or the effect may be made that of variegated color by the addition of suitable color or colors not previously fused with glass.

Oxid of zinc can be used to whiten the cementing agent; but unless used and applied and dried very soon after mixing it spoils the cementing agent by rendering it powdery and of little strength.

The cementing agent may be applied to one or both faces of a tile for color effect alone, or may be applied for color effect and material for retaining-points be applied at any time later, either by the cementing agent of the present invention or in any other suitable manner.

By placing this cementing agent on a tile and then allowing it to dry and exposing the tile for some time to the action of the air at ordinary temperatures or by drying and subjection to an artificial heat below that of fusion of the cementing agent the latter will become hard and insoluble and forms an inseparable covering, back, or face to the tile, and where material for retaining-points is applied to this cementing agent, either before the cement becomes hard or afterward, by additional cementing agent the latter forms an inseparable bond between the tile and the material added for retaining-points or between cementing agent on the tile, which has been allowed to harden, and subsequently superimposed material for retaining-points.

The tile to which the cementing agent is to be applied may be entirely of vitreous material or of metal or may be a faced or faced and backed tile—that is to say, one faced or backed or faced and backed with a plate or with plates of some porous material, such as earthenware or china, having a glazed or unglazed surface or with a plate or with plates or a sheet or with sheets of metal. Where a glass tile is employed, it should preferably be colorless or nearly colorless.

After the cementing agent is made up and ground finely and to a consistency of moderately thin paste or plastic mixture it is spread evenly and in one or more coats on the surface or surfaces to be colored or to be provided with retaining-points. The material—as, for instance, a glass tile—to which the cementing agent is applied may be of any of the materials already mentioned, the coating or layer of cementing agent to be of from one-fortieth of an inch to one-tenth of an inch, more or less, in thickness, and while still soft and plastic the surface is sprinkled with sharp sand or powdered glass or powdered rock and the tile laid aside for the cementing agent to dry and harden, after which all loose or non-adherent sand or powder is shaken off and the tile is then placed in an oven and very gradually heated up to a final temperature of about 360° Fahrenheit, and the fire is then shut off, and with the oven still kept closed the whole is allowed slowly to cool down to the temperature of the air. In the beginning of the heat the temperature is allowed to rise so slowly that at the end of the first two hours the heat of the oven is not above 200° Fahrenheit, and from this point the temperature in the oven is slowly raised during a period of about three hours to 360° Fahrenheit and is held at this heat for about one hour, at the expiration of which time the fire is shut off and the oven and its contents allowed to cool slowly.

Where a transparent tile is to be colored and its back rendered granulous, the following procedure may be preferable: The cementing agent containing the alkaline silicate holding the desired color is spread in one or more coats on the surface or surfaces to be provided with retaining-points and then allowed to dry or become partially dried, whereupon a similar cementing agent is applied to this dry or partially dry layer, and upon the latter is then placed the granular substance, the whole being then hardened and rendered insoluble by exposure for some time to the air at ordinary temperatures or by drying and subjection to a moderate artificial heat. By allowing the first layer of the cementing agent holding the color to become partially dry and then applying thereon a second similar cementing agent and finally placing the granular substance on the second layer the sand, powdered glass, powdered rock, or the like cannot penetrate through the first layer and be seen from the opposite side.

When working on glass, it has been found economical to coat and sand the glass in large sheets anywhere from thirty-six inches square to plates thirty inches by eighty-four inches, and then after drying at the temperature of the air, but before baking, these large plates are cut up to the size desired and placed in the oven for baking. When, however, metal plates with a rough backing are to be used for tiles, the metal sheet is preferably first cut into pieces of the desired shapes and sizes before applying the rough backing.

It will be understood that a tile or other object to be used in ornamental or other construction and completed according to our invention is to be set in place in Portland or other suitable cement or plastic matter with the added granulous material on its surface presenting retaining-points set into such cement or suitable plastic matter.

While in the foregoing specification we have described the invention as finding particular employment in the attachment of tiles to walls and ceilings, it will be obvious that pillars, columns, and other structures, even small articles, may be made of any suitable material with our cement with or without an additional facing superimposed.

Having thus described our invention, what we claim as new, and desire to secure by Letters Patent, is—

1. The method of rendering the back of a tile granulous, which consists in applying thereto a cementing agent, which becomes hard on drying and is rendered insoluble by heat, placing thereon a granular substance, then drying the same to render the cementing agent hard, and then subjecting the whole to a temperature below that of fusion, whereby the cementing agent will be rendered insoluble, substantially as described.

2. The method of coloring tiles, which consists in applying thereto a cementing agent containing an alkaline silicate holding a desired color, which color will render the cementing agent insoluble, then drying, and then subjecting the tile so treated to exposure to air or artificial heat, substantially as described.

3. The method of coloring a transparent tile and rendering the back thereof granulous, which consists in applying to the back a pasty mass, consisting of a cementing agent containing an alkaline silicate holding the desired color, which color will render the cementing agent insoluble on drying and exposure, or on drying and heating, then placing thereon a granular substance, then hardening the mass by drying, and finally rendering the same insoluble by exposure to the air or artificial heat of a temperature below that of fusion, substantially as described.

4. The method of coloring a transparent tile and rendering the back of the same granulous, which consists in applying to the back of the tile a cementing agent containing an alkaline silicate holding the desired color, which color will render the cementing agent insoluble on drying and exposure, or on drying and heating, and then drying this cementing agent, then applying a similar cementing agent to the one dried, then placing on the last-applied cementing agent, before drying, a granular substance, and then drying, by exposure for some time to the air, at ordinary temperatures, or to a moderate artificial heat, and finally, rendering the cementing agent insoluble by long exposure to the air or to an artificial heat, at a temperature below that of fusion, substantially as described.

5. The method of coloring a transparent tile and rendering the back of the same granulous, which consists in applying to the back a cementing agent containing an alkaline silicate holding a desired color, which color will render the cementing agent insoluble on drying and exposure, or on drying and heating, partially drying the cementing agent, then applying a similar cementing agent to the colored layer, then placing on the last-applied cementing agent a granular substance, then drying by exposure for some time to the air, at ordinary temperatures, or to a moderate artificial heat, and finally rendering the cementing agent insoluble by subjection to an artificial heat at a temperature below that of fusion.

In testimony whereof we affix our signatures in presence of two witnesses.

CHARLES FRANCIS LAWTON.
ALBERT L. LAWTON.
ARTHUR W. LAWTON.

Witnesses:
W. H. TAPLEY,
H. H. DOUBLEDAY.